US012600651B2

(12) United States Patent
Suddath

(10) Patent No.: US 12,600,651 B2
(45) Date of Patent: Apr. 14, 2026

(54) FLUID TREATMENT APPARATUS WITH INTEGRAL CLEANING SYSTEM

(71) Applicant: Ralph Suddath, Hickory Creek, TX (US)

(72) Inventor: Ralph Suddath, Hickory Creek, TX (US)

( * ) Notice: Subject to any disclaimer, the term of this patent is extended or adjusted under 35 U.S.C. 154(b) by 286 days.

(21) Appl. No.: 18/382,220

(22) Filed: Oct. 20, 2023

(65) Prior Publication Data

US 2025/0128970 A1 Apr. 24, 2025

(51) Int. Cl.
*C02F 1/48* (2023.01)

(52) U.S. Cl.
CPC ............ *C02F 1/48* (2013.01); *C02F 2209/05* (2013.01); *C02F 2301/024* (2013.01); *C02F 2301/026* (2013.01); *C02F 2303/04* (2013.01); *C02F 2303/16* (2013.01)

(58) Field of Classification Search
CPC .... C02F 1/36; C02F 1/48; C02F 1/487; C02F 2303/04; C02F 2303/16
See application file for complete search history.

(56) References Cited

U.S. PATENT DOCUMENTS

| | | |
|---|---|---|
| 7,238,289 B2 | 7/2007 | Suddath |
| 7,473,374 B2 | 1/2009 | Suddath |
| 8,106,849 B2 | 1/2012 | Reavis et al. |
| 8,305,290 B2 | 11/2012 | Reavis et al. |
| 9,105,958 B2 | 8/2015 | Suddath |
| 9,356,339 B2 | 5/2016 | Reavis et al. |
| 2002/0060178 A1 | 5/2002 | Tsabari |
| 2004/0251211 A1 | 12/2004 | Suddath |
| 2007/0039894 A1 | 2/2007 | Cort |
| 2007/0235379 A1 | 10/2007 | Suddath |
| 2008/0185321 A1 | 8/2008 | Beaulieu |
| 2011/0050520 A1 | 3/2011 | Reavis et al. |
| 2012/0024718 A1 | 2/2012 | Foret |
| 2012/0182192 A1 | 7/2012 | Reavis et al. |
| 2013/0100000 A1 | 4/2013 | Reavis et al. |
| 2013/0328729 A1 | 12/2013 | Suddath |
| 2014/0008366 A1 | 1/2014 | Genosar |
| 2022/0089460 A1 | 3/2022 | Irvin, Sr. |

*Primary Examiner* — Bradley R Spies
(74) *Attorney, Agent, or Firm* — Jeffrey G. Degenfelder; Carstens, Allen & Gourley, LLP

(57) ABSTRACT

An apparatus is provided that introduces rapidly spinning vortices in a fluid, including water. It incorporates a fluid system, or fluid source, with a vortex creation apparatus and a frequency generation device. The vortices prepare the fluid to have memorized electromagnetic frequency signatures of harmful materials erased, and a new, desirable signature introduced. The desirable frequency can be introduced though a number of means, such as an electrical frequency generator. The desirable frequencies make the fluid an inhospitable environment for biological contaminants, such as bacteria, algae, and fungi, reducing their numbers in the fluid. A portion of the fluid may be passed through a plurality of micro-spheres to interact with the water molecules to polarize mineral salts preventing the formation of deposits on the inside of related plumbing. The apparatus further includes an integral cleaning system and method that periodically detects when the micro-spheres lose their effectiveness due to a coating of mineral deposits contained in the fluid and dispenses a biologic cleaning fluid to cleanse the micro-spheres.

20 Claims, 8 Drawing Sheets

100

14

FLUID TREATMENT APPARATUS WITH INTEGRAL CLEANING SYSTEM

BACKGROUND OF THE INVENTION

Background

Applicant's invention relates to a device for treating fluids and a method for same. More specifically, it relates to a fluid, and particularly water, treatment system to reduce contaminants such as bacteria, algae, and fungus in the fluid without the use of chemicals.

Earth's water is continually cycled via a natural circulation system. Water moves from pools, streams, lakes, and rivers to the sea, it evaporates and enters the atmosphere, falls from the air back to earth, is absorbed into the ground, collects in underground aquifers, and re-emerges from underground through springs.

Water that has not been substantially affected by humans may be referred to as "natural water." Humans use the circulating "natural" water and then return it to the circulation cycle. Unfortunately, often humans' use pollutes the water, resulting in "unnatural water." A characteristic of "unnatural water" is that it attracts and is susceptible to the growth of unhealthy contaminants such as bacteria, algae, and fungus. It has an altered state of pH, and a higher surface tension than "natural water."

Water emits an electromagnetic frequency (EMF) that can be measured. Natural water has its own EMF signature. However, water is an energy seeking substance that picks up frequencies from minerals, chemicals, and other substances it contacts. When this happens the water's EMF signature is altered to mimic that of the impurities. Thus, water can be said to have "memory." Even though water can be chemically or mechanically "purified" with the intention of ridding the water of as many polluting substances as possible, it still carries memorized electrical frequencies, in specific frequency bands (wavelengths). After any purification, chemical treatment, filtration, or even after distillation, the pollutants' harmful frequency information remains in the water. The memorized EMF signature can be tracked precisely to the detrimental substances which were in the water before treatment.

As noted in U.S. Pat. No. 5,711,950, "when sodium chloride is dissolved in water, water molecules surround the sodium and chloride ions to produce ion hydrates. The resulting geometry or the water molecules differs from that of the prior clusters of hydrogen-bonded water molecules. The water molecules become more highly ordered and regular in structure. The addition of sodium chloride to microclustered water effects the same result. Thus, the sodium chloride may be said to function as a "template" for the change." This template or "pattern" is what secures the change in the water, locking in the extraordinary structure produced by this invention.

A molecule's shape can be as important to function as its composition. Electronic bonding patterns, determined by cluster shape, alter the behavior and properties of all phases of matter. When electrons are shared by the whole cluster in a de-localized pattern, negative charge is evenly distributed and the cluster may take on certain aspects of solid metal, such as conductivity. When the electrons are all tightly bound to atoms, the clusters resemble discrete molecules.

The covalent bonding of two hydrogen atoms to one oxygen atom forms the water molecule ($H_2O$). To complete its outer shell, oxygen needs two electrons, and it obtains these by sharing an electron with each or two hydrogen atoms. These bond to the oxygen atom to form a triangular structure. This shape is important because it forms the basis for many of the solutions and compounds that support life.

A water molecule's covalent bonds are polar in that the bonded atoms share electrons, but the electrons are attracted more strongly to the oxygen nucleus than to the hydrogen nuclei. This creates a small positive charge near the two hydrogen nuclei. Clusters of water molecules form because the positive charges of the hydrogen atoms are attracted to the negative charge of the oxygen atoms from other water molecules. It is well known that such hydrogen bonds play important roles in many biological compounds, and is essential for maintaining the shape or large molecules such as proteins and nucleic acids.

The pattern or clustering of water is evidenced by the ability to photograph a crystal formed by the water. A crystal is a solid substance with orderly-configured atoms and molecules. In addition to being in snow and crystallized quartz, crystals are also seen in natural minerals such as diamonds and table salt. When a water molecule crystallizes, pure or "natural" water becomes pure crystal, but contaminated, chemically treated "dead" or "unnatural" water may not crystallize in the natural tetrahedron. Water treated by the present invention crystallizes in the same manner as "natural" water.

The vortex is a universal background of nature. Vortices deliver energy and are tools that nature uses to assemble and disassemble its creations. Vortices form matter, shape it and hold it together. They guide processes by centripetally charging and feeding growth and then centrifugally discharging it and throwing it back to death or non-motion. A vortex is an orderly, consistent, regenerating technology.

Vortices exist in water such as in creeks, rivers, or in the air. Within every stream, water constantly circles in small vortices called eddies. The same movement is seen in the waves of the ocean constantly rolling in spiral movements. This motion causes water to gather electrical force. Water stores this potential energy. The centripetal, inward-directed movement of water causes it to become rejuvenated.

Implosion causes matter to move inwardly. This inward (centripetal) motion does not follow a straight path to the center, but a spiraling whirling path—a vortex. The outside of the vortex moves slowly and the center moves much more quickly. As water is imploded, suspended particles, which are denser than water are sucked into the center of the flow, frictional resistance is reduced and the speed of the flow increased. Changes of the chemical properties in the water have been reported, including changes of the oxygen content, surface tension is reduced, and the precipitation and bonding of metal ions has occurred.

Thus, there is a need for a method and device for erasing the memory of polluted water, and changing the water's EMF signature from that of a pollutant to that of natural water.

Prior art devices have demonstrated some ability to modify the quality of water to some degree. Most have employed a ring or horseshoe shaped magnet to fit over the outside of the plumbing to affect the polarization of the water molecule. Others have employed DC current wire coils to offset the same outcome. A few have inserted DC electrodes into the water cavity to modify the quality of the water. Others have used a high voltage electric discharge to produce ozone in a closed chamber with resulting gas being injected into the water flow thus sterilizing the water.

That some magnetic treatments of water can have lasting effects on water is known. X-ray crystallography and electron microscopy have been used to examine scale formed by hard water. The scale formed by untreated water and by magnetically treated water is different. There is a difference in the scale from the treated and untreated water, which extends for at least several days.

For example, CEPI-CO, of Belgium has sold hundreds of thousands of its anti-magnetic water treatment to reduce scaling in industrial cooling circuits. These magnetic water treatment units are in continuously recirculating systems and are solely for the purpose of scale suppression. Nevertheless, their useful results prove that magnetic treatment of water can have lasting beneficial effects and can cause changes in the water's crystallization behavior. These results have only been obtained via dynamic magnetic treatment, i.e., the fluid moving rapidly through an orthogonal magnetic field to produce semi-permanent changes in the water.

Further, magnetic fields are also known to reduce the surface tension and viscosity of water. Studies have shown that magnetic treatment of water can alter the effectiveness of certain types of bacterially mediated oxidation of pollutants.

The instant invention likewise non-chemically treats water in a way that imparts a beneficial memory, or semi-permanent effect, of the treatment to the water.

There are previous apparatus for magnetically treating fluid. The magnetic field is normally applied axially by winding an electromagnetic coil about a tube or vessel through which the fluid is passed. Thus, efficiency is poor as the applied voltage is increased near the magnets, and decreased in the center of the tube. The field strength is non-uniform, and as a result is ineffective.

U.S. Pat. No. 3,873,448: This invention is described as "a magnetic separator having particular utility in separating ferromagnetic materials with sizes on the order of microns from viscous fluids". The separator utilizes a ferromagnetic filler in the form of a bed of ferromagnetic particles through which the fluid is passed. The magnetic field established in the filter extends transversely to the direction of fluid flow. Electromagnetic coils in a position relative to electromagnets cause the field. The invention further required flushing when the filter medium is filled with particles. In addition the DC potential on the coil, must be then changed to an AC potential. This caused demagnetization of the particles forming the filler. The filter medium is described as "steel shot or other particles constituting filter," and as a layer of seven inches thickness of one-sixteenth Inch stool shot" in this design. There is no reference to the significance of the round balls of the steel shot, and the patent appears to only use it as a filter that can be magnetized. While this invention does include round steel shot as a filter, its purpose is as a separator of ferromagnetic materials.

U.S. Pat. No. 4,836,932: This invention uses a "water treatment cell" producing locally strong "super magnetic fields (60,000 to 250,000 Gauss)." This is accomplished when minute highly intense magnetic fields are produced, with stabilization of micro-magnet geometry. These fine particles are dispersed in nonmagnetic media. This "super magnet" is then placed in a vessel for treating the water. Minerals such as ionized calcium in the water precipitate out as calcium powder at the bottom of the vessel. This technology is primarily used to separate waste materials from the water. In addition, a turbulent flow is required, but may need to be adjusted. The invention's intended use is in a recirculating system for descaling. No round balls or magnets are used, and the water is passed into a vessel containing these super magnets.

U.S. Pat. No. 3,869,390: This mechanism is an electromagnetic filter for removing iron oxide from the feed water of boilers in steam power plants. It includes a filter bed of metal balls in a vessel with an excitation coil located about the vessel. The coil has passages for cooling and a jacket allows for openings for the cooling medium. The magnetic field is produced outside the balls. This device is a filter that requires DC and AC current, and is limited to a specific use.

U.S. Pat. No. 4,501,661: This invention claims to provide a method and apparatus for purifying and activating water, to obtain natural-like water being fungi-free clean and rich in taste and minerals. The device consists of three chambers: 1. The first a deceleration zone using an agent in porous granular form with an ability to decompose combined chlorine and absorbs free chlorine, such as calcic ceramic (obtained from shells of shellfish and treating them at ultrahigh temperature. 2. The second chamber is an activation zone where water is disordered with its equilibrium state and ionized. The water will be neutral or weak-alkaline in this zone. This is accomplished by using charged particles of Elvan (magnetic multielementary mineral) and magnet bars installed longitudinally among said particles. 3. The third chamber, the settlement zone is to disturb the ionic balance of water and orient it to be softened. This chamber contains a magnet ball of acrylic resin, which contains a magnetic pellet in its free space. The number of balls could be as few as three. This device is complex, contains many mediums of treatment, and does not use the magnetic balls for flow or direction, but only as a source of a magnetic field. The magnetic field is not claimed to dechlorinate, as a medium is claimed to accomplish that in the first chamber. The use of magnetic balls is not comparable to the present invention.

U.S. Pat. No. 4,904,381: This device is an apparatus for magnetization treatment of fluid by having a rotor with a magnetic field generator rotatably in a passage or reservoir of fluid, and a rotating means coupled to the rotor. Treatment is effected by a magnetic field generator, which is rotated integrally to generate a rotating magnetic field in its surroundings. Again, a filter member is applied to the water in a chamber containing small balls formed of a permanent magnet and gold or silver-plated. Each produces a static magnetic field against the water and narrow gaps serve to remove impurities contained in the water. The inventor states that the filter member need not be limited to round ball magnets, but might be of ceramics containing Ca, Mg and other elements effective for drinking water and agricultural products. The magnetic field generator comprises a plurality of permanent magnets. An air suction pipe is provided to increase water flow rate, producing bubbles to increase oxygen content of water. The filter member, round magnet balls, is used remove impurities not to treat the water. Water treatment and changes occur due to the magnetic field generator rotating in the first chamber.

More recently, the Applicant has disclosed in U.S. Pat. Nos. 7,238,289 and 7,473,372 systems and methods that introduce rapidly spinning vortices in a fluid, such as water, that includes a vortex creation apparatus and a frequency generation device. The vortices prepare the fluid to have memorized electromagnetic frequency signatures of harmful materials erased, and a new, desirable signature introduced. The desirable frequency can be introduced through a number of means, such as electricity, sound waves, and magnetic fields, using such devices as power leads, speakers, transducers, and magnets. The desirable frequencies make the fluid an inhospitable environment for biological contaminants, such as bacteria, algae, and fungi, reducing their numbers in the fluid. The fluid may be passed through a plurality of magnetic micro-spheres to interact with the water molecules to polarize mineral salts preventing the formation of deposits on the inside of related plumbing.

While the systems and methods disclosed in U.S. Pat. Nos. 7,238,289 and 7,473,372 are effective in erasing the electromagnetic frequency signatures of harmful materials in a fluid and introducing desirable frequency signatures, over time it has been observed that the micro-spheres in the vortex creation apparatus gradually lose their effectiveness due to a coating of mineral deposits contained in the fluid that forms on the micro-spheres of the vortex creation apparatus. It has been found that this loss in effectiveness can be detected by observing a decline in the conductivity of the system and the treated fluid. The coating of mineral deposits on the micro-spheres gradually diminishes the effectiveness of the vortex creation apparatus, which in turn results in a gradual decrease in its ability to effectively treat the fluid.

While the degradation of the vortex creation apparatus can be remedied by replacing the used vortex creation apparatus, such an option is expensive and wasteful. Moreover, it is inefficient to do so, especially if the vortex creation apparatus is a component part contained within a larger treatment system. In addition, testing and experience has revealed that the previously disclosed vortex creation apparatus can be simplified and used more efficiently and effectively. Thus, there is a continued need for an improved method and device for erasing the memory of a polluted or contaminated fluid, and changing the fluid's EMF signature from that of the pollutant to that of natural water, that further includes an integral method and device, which can detect an appreciable degradation of the effectiveness of the micro-spheres within the vortex creation apparatus and automatically cleanse the micro-spheres restoring their effectiveness.

SUMMARY OF THE INVENTION

The present invention includes an apparatus and system that introduces rapidly spinning vortices in the fluid. The vortices prepare the fluid to have memorized EMF signatures of harmful materials erased, and a new, desirable signature introduced. The present invention further incorporates a means for adding a desirable frequency to the fluid. In addition, the apparatus of the present invention further includes an integral cleaning system and method that periodically detects when the apparatus has lost its effectiveness and a means for restoring the effectiveness of the system. Moreover, testing and experience have revealed that the previously disclosed vortex creation apparatus can be simplified and used more efficiently and effectively.

The present invention provides a novel apparatus that will treat water, or other fluids, in a manner that returns them to their natural states. Further objectives of the present invention are:

a. To provide for treatment of polluted water and fluids.

b. To reduce or eliminate the need for chemical sanitizers such as chlorine, bromine, stabilizers, algaecides, and clarifiers in swimming pools, spas, cooling towers, municipal and other water systems.

c. To provide treatment of other fluids to provide clusters to make them more efficient and effective.

d. To reduce surface tension of water.

e. To retard growth of algae, bacteria, and fungus in water.

f. To increase electrical conductivity.

g. To establish hydrogen bonding. Water is either structured or unstructured, dependent upon whether or not hydrogen bonding connects clusters of water molecules together or not. Water that is structured with hydrogen bonding will have a more balanced pH.

h. To simplify the construction of components of the apparatus and system.

i. To automatically detect and clean the apparatus and system of the present invention when needed.

Under normal conditions, natural clustering or water molecules is short lived and the cluster size is unpredictable. The present invention changes the cluster pattern of the water or other fluids, causing change to be long lasting. Water which has been treated to have a more ordered and stable structuring of water molecules has been produced by other inventions using magnetic treatment of the water, but none has imparted a new pattern or cluster to the water, thereby, they have been unable to "hold" the change in the water. They do not complete the process needed to remove the negative programming and impart new programming, thereby semi-permanently changing the water.

The present invention removes the negative "frequencies or programming," structure the water to receive a new program, and impart that program to the water. This process will cause the improvements in the water to be longer lasting, without constant recirculation of the water through the device.

It is anticipated that the present invention will be useful for industries such as: municipal water treatment, pool and spas, hotels and restaurants, air conditioning, agriculture, food and beverages. Among other effects, the present invention has been measured to reduce the surface tension of tap water from 72 to 62 dynes per centimeter. The semi-permanent nature of the described effects makes the treatment useful for pools, municipal water supplies, and the like.

The improved system includes a simplified vortex creation module that does not require strainers or strands of different metals. In addition, the apparatus and system of the present invention further includes an integral cleaning system and method that periodically detects when the micro-spheres of the vortex creation module lose their effectiveness due to a coating of mineral deposits contained in the fluid and automatically dispenses a biologic cleaning fluid to cleanse the micro-spheres.

In addition, testing and experience have revealed a more optimal way of employing the apparatus and system of the present invention to more effectively and efficiently retard growth of algae, bacteria, and fungus in water.

BRIEF DESCRIPTION OF THE DRAWINGS

A more complete understanding of the method and apparatus of the present invention may be had by reference to the following detailed description when taken in conjunction with the accompanying drawings, wherein.

Figure 1A:
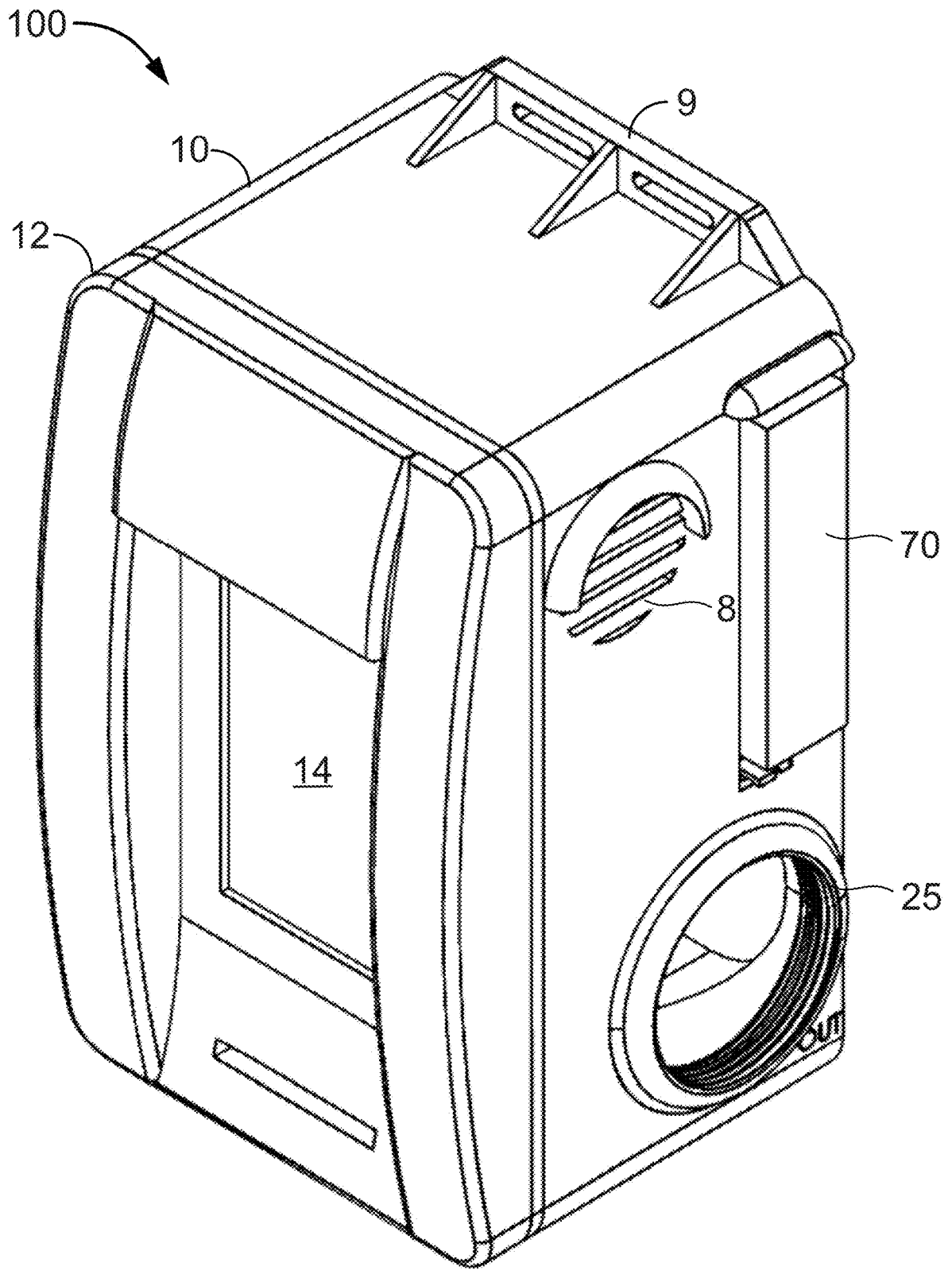
FIG. 1A is a front perspective view of an embodiment of the present invention.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE PREFERRED EMBODIMENTS

The fluid treatment apparatus of the present invention includes a simplified and improved fluid treatment apparatus. The present invention includes an improved design for a vortex creation module that does not require strainers or strands of different metals. In addition, the apparatus and system of the present invention further includes an integral cleaning system that periodically detects when the micro-spheres of the vortex creation module lose their effectiveness due to a coating of mineral deposits contained in the fluid and automatically dispenses a biologic cleaning fluid to cleanse the micro-spheres.

Testing and experience have revealed a more optimal way of employing the apparatus and system of the present invention to more effectively and efficiently retard growth of algae, bacteria, and fungus in water. It has been found that only a portion of the total fluid that passes through the system needs to pass through the vortex creation module to effectively treat the fluid to retard or eliminate a sufficient amount of biological contaminants such as bacteria, algae, and fungi. Indeed, it has been found that the system should only operate once or twice a month for 4-12 hours to effectively treat a 12,000-gallon pool.

While a preferred embodiment of the present invention is described and depicted in the Figures, the principals and lessons of the disclosed apparatus, system and methods are applicable to a wide variety of applications. For example, pool water or municipal water may be treated in accordance with the above specification, and scaled up or down as needed depending upon the volume of the water to be treated, the expected time period between treatments, and the extent to which the water is polluted. The fluid treatment apparatus will more benignly kill biological active components of the treated fluid than other methods of killing such biological active components. Heavy chlorination, a sufficiently intense magnetic field, and sufficient pressure will all kill bacteria. However, the present invention kills bacteria more economically and with semi-permanent effects, in other words, water treated by the present invention resists reinfection by biological contaminants such as bacteria, algae, and fungi.

Figure 1B:
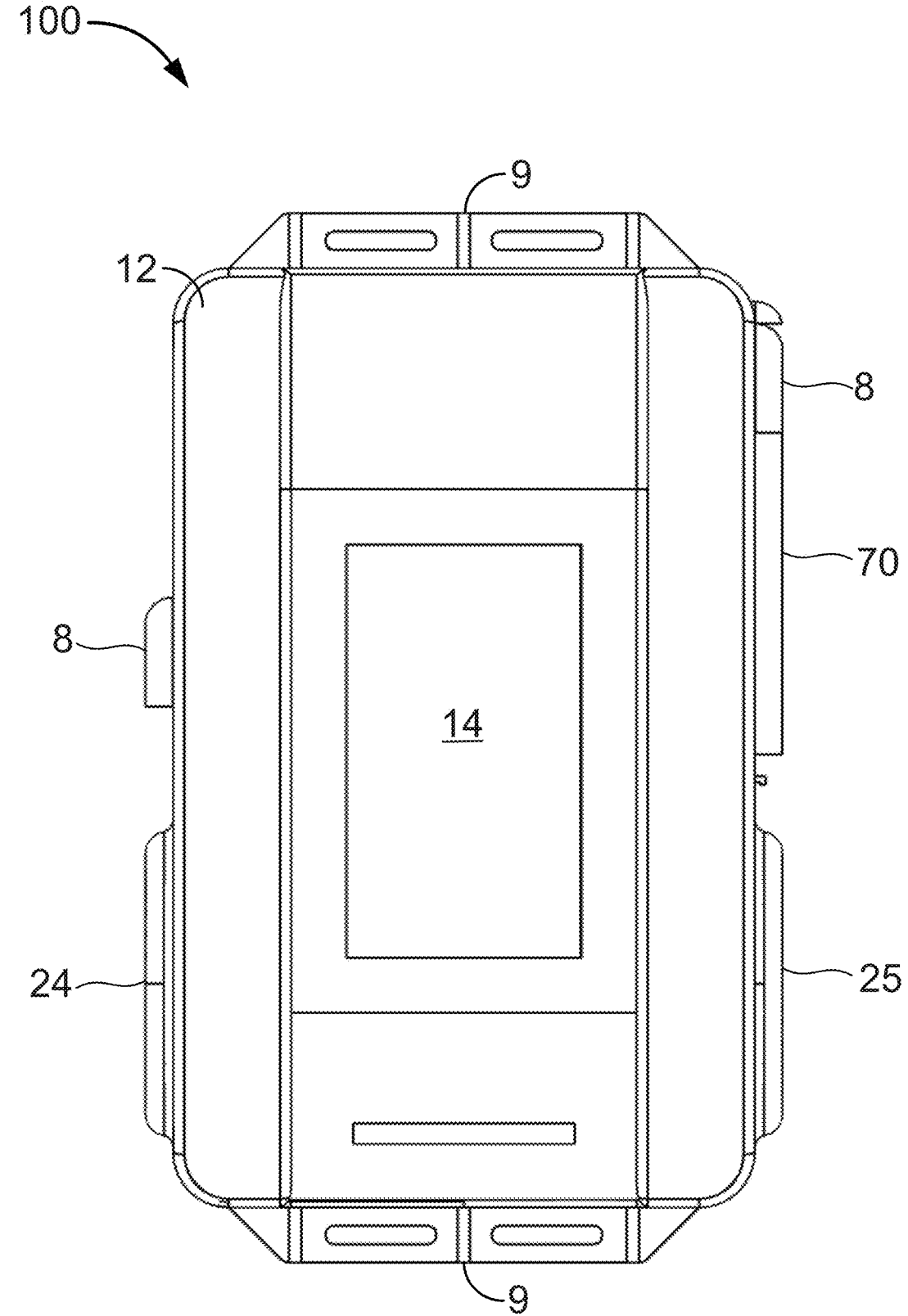
FIG. 1B is a front elevation view of thereof.

With reference to FIGS. 1A-1B, a front perspective and front elevation of a first embodiment of the present invention are depicted. The fluid treatment apparatus 100 comprises a main housing 10 having an attached cover 12. The main housing 10 further includes one or more mounting brackets 9 incorporated therein for mounting the apparatus. The main housing 10 further includes an inlet 24 and outlet 25 for supplying fluid, such as water, (not shown) to the apparatus for treatment. The main housing 10 may further include one or more air vents 8 for supplying and exhausting ambient air to and from the interior of the main housing 10. The main housing 10 also includes a slot or compartment for inserting a biologic cartridge 70 which will subsequently be described in greater detail. The main housing 10 and attached cover 12 are constructed of a durable non-corrosive waterproof material such as metal or thermoplastic.

Figure 2A:
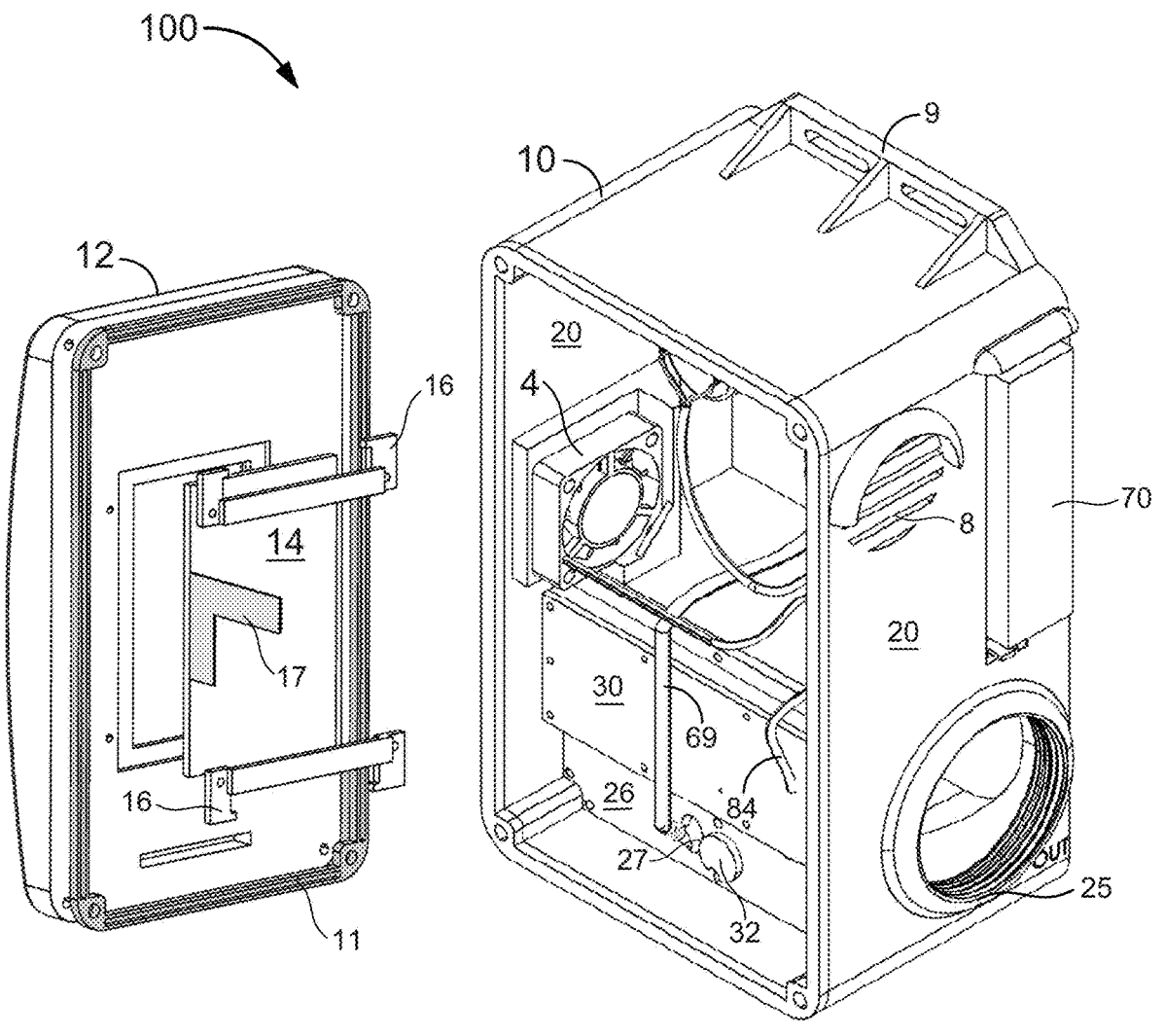
FIG. 2A is a front perspective view of the embodiment of the present invention shown in FIG. 1 with its housing cover in an opened position.
Figure 2B:
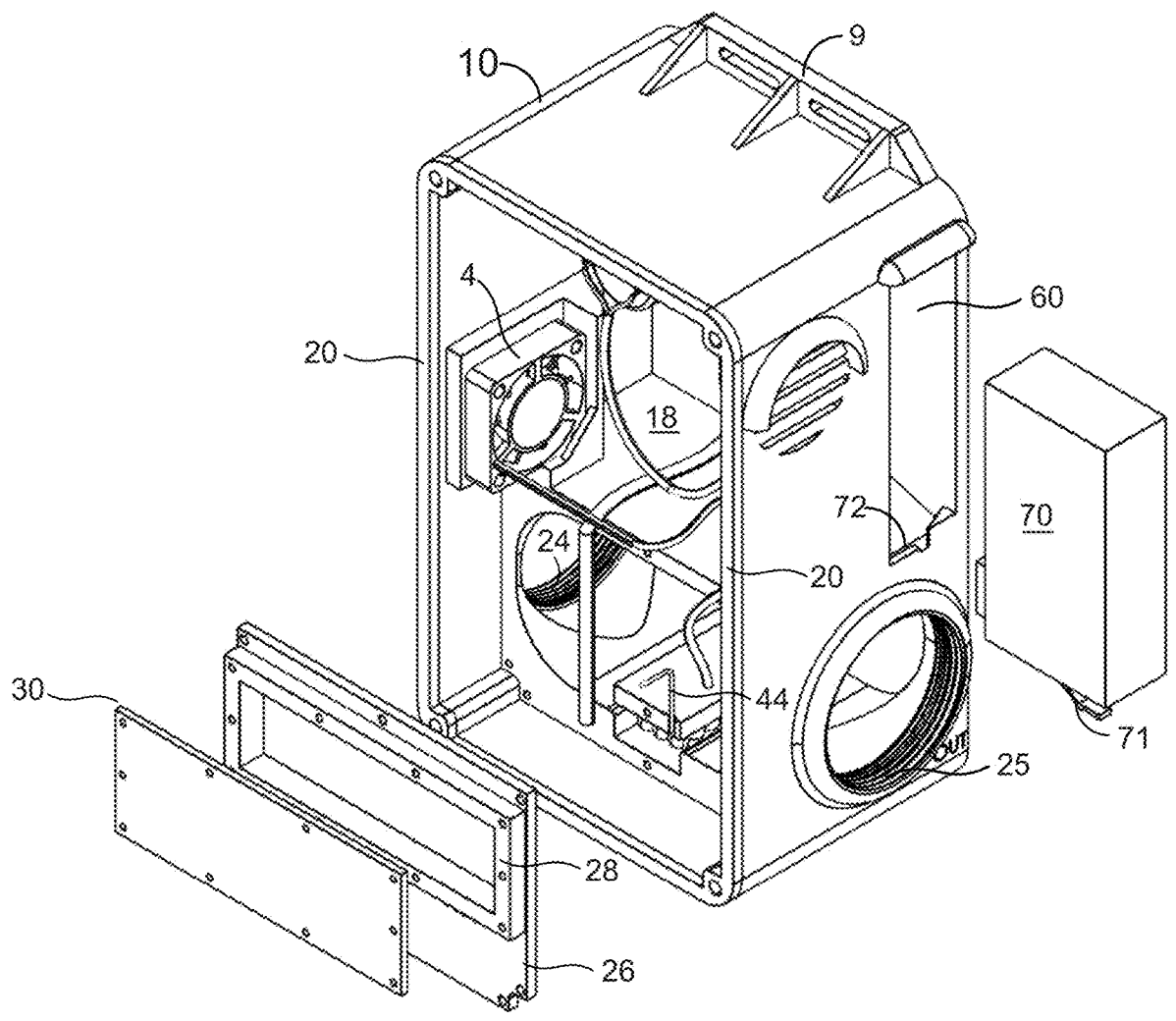
FIG. 2B is a partially exploded view of the embodiment of the present invention shown in FIG. 2A with the door removed.

The cover 12 of the fluid treatment apparatus 100 includes a computerized display 14 for operating and programming the fluid treatment system. The display 14 may include various buttons or be a touchscreen, and displays operating information to the user of the apparatus 100. As shown in FIG. 2A, in one embodiment, the display 14 is attached to the backside of the cover 12 by means of brackets 16 attached to the backside of the cover 12. The display 14 may further include an interface connector 17 for plugging into a slot 86 on the interface printed circuit board (PCB) 80 (see FIG. 2C). While the interface connector 17 is depicted as a hard wired electrical connection, it is understood that the display can be electronically connected to an interface PCB 80 with a wireless computerized connection. The interface PCB 80 powers and controls all of the component systems contained within the main housing 10.

With reference again to FIG. 2A, the fluid treatment apparatus 100 may also include a gasket 11 configured between the main housing 10 and attached cover 12 for sealing the main housing 10 and attached cover 12 together. For example, connecting devices, such as screw fasteners (not shown) or tension latches (not shown), may be used to attach and seal the cover 12 to the main housing 10.

With reference now to FIGS. 2A-2D, the interior of the main housing 10 is divided into two compartments by a lateral partition 18 configured between the two side walls 20. The upper compartment or section 19 is designed to be dry and contains the electronic and control devices of the apparatus. For example, the upper compartment or section 19 may contain a power supply device 2 electrically connected to an interface PCB 80 by means of a power supply cable 82. The upper compartment or section 19 may also include a fan device 4 connected to the interface PCB 80 via an electrical interface cable 6. When activated the fan 4 circulates ambient air throughout the interior of the main housing 10 via air vents 8. The upper compartment or section 19 also includes a biologic dispensing system, which periodically dispenses biologic cleaning fluid into a vortex creation module 40 configured within a fluid passageway of the lower section or water compartment 22.

The biologic dispensing system includes dosage pump 50 connected to the interface PCB 80 via an electrical interface cable 52. The dispensing system also includes fluid conduits which supply the pump 50 with biologic cleaning fluid from a supply cartridge 70 and distribute an effective amount of the biologic cleaning fluid into a port 27 configured near the vortex creation module 40 within the fluid passageway of the lower section or water compartment 22. In one embodiment, the biologic cleaning fluid comprises biological microbial enzymes. For example, a biologic cleaning fluid comprising genus *bacillus* has been found to be quite effective.

The lower section or water compartment 22 contains a fluid passageway for connecting the fluid treatment apparatus 100 into a circulating pipeline (not shown) via the fluid inlet 24 and outlet 25. The fluid inlet 24 is connected to a fluid supply line (not shown) which supplies a continuous stream of fluid for treatment, while the fluid outlet 25 channels the treated fluid via an outlet line (not shown) back to a circulating supply reservoir (not shown). While the fluid inlet 24 and outlet 25 are depicted having a screw-in connections, it is understood that the circulating supply line and outlet lines may be adhesively bonded to their respective fluid inlet 24 and outlet 25.

The fluid passageway of water compartment 22 is further enclosed by a water-tight compartment cover 26 configured towards the front of the main housing 10. The compartment cover 26 may also include an injection port 27 and a sight window 28, which is covered by a signal board PCB 30. The signal board PCB 30 provides a waterproof seal to the sight window 28 and includes sensors for detecting and measuring characteristics of the fluid (e.g., temperature, conductivity, pH and flow rate) flowing through the water compartment passageway 22. The signal board PCB 30 may further include a frequency generator connected to a frequency antenna 44. The frequency generator supplies power to the frequency antenna 44. For example, in one embodiment the frequency generator supplies direct current (DC) electricity to the frequency antenna 44 with variable frequencies at up to 1000 Hz. The frequency antenna 44 may comprise a single lead connected to the frequency generator with no ground lead provided. In this case, the electrical circuit between the frequency antenna 44 and the frequency generator is not complete. The power that is passed to the frequency antenna 44 is DC current with variable frequencies of up to 1000 Hertz. Thus, frequency is released into the water (not shown) near the exit of the vortex creation module 40. The signal board PCB 30 is electrically connected to the interface PCB 80 via connection 84. While connection 84 is depicted as a wire or cable, it is understood that connection 84 may further include a wireless computerized connection.

Figure 2C:
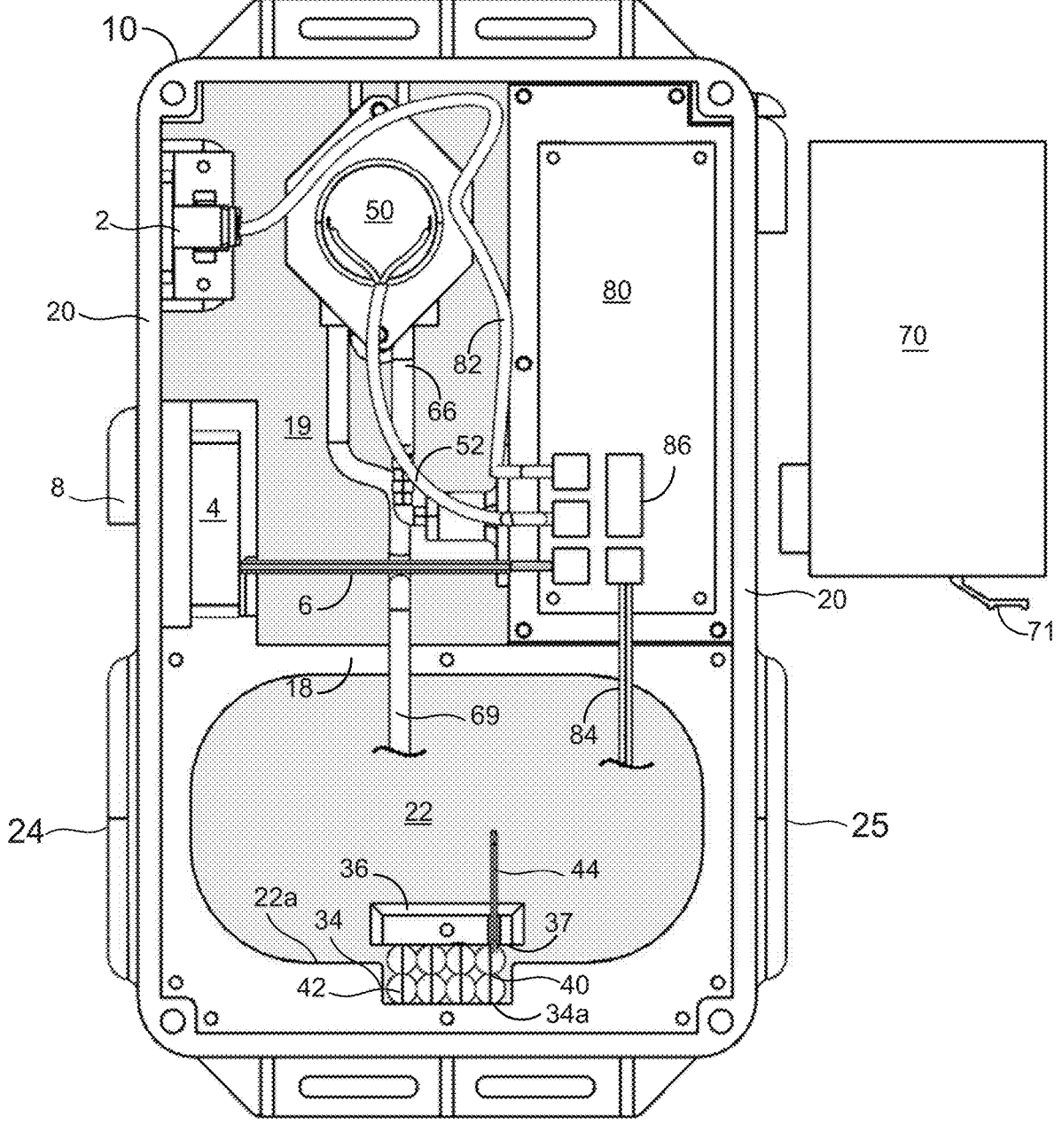
FIG. 2C is a front elevation view of thereof.
Figure 2D:
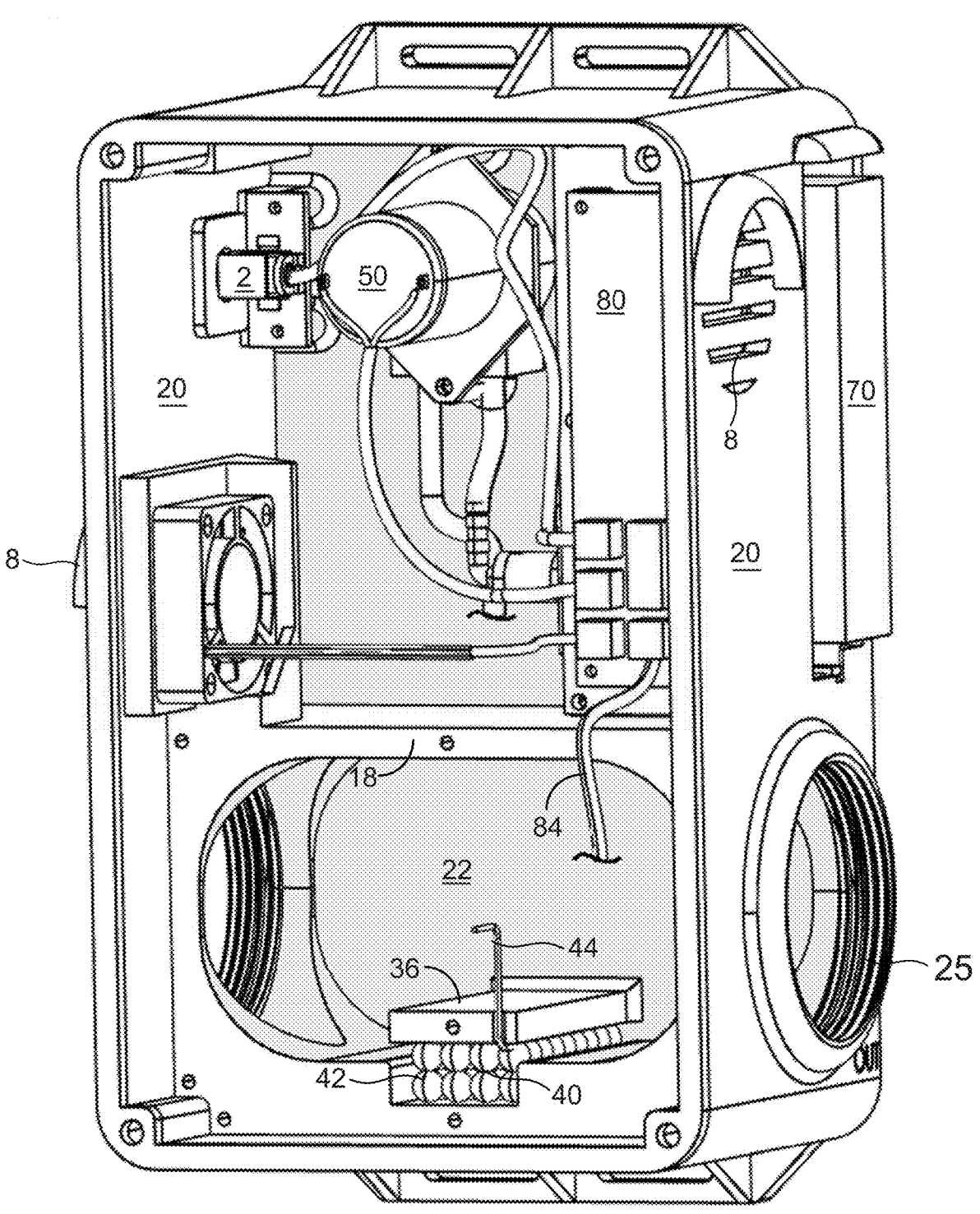
FIG. 2D is a front perspective view of the elevation view shown in FIG. 2C.
Figure 3:
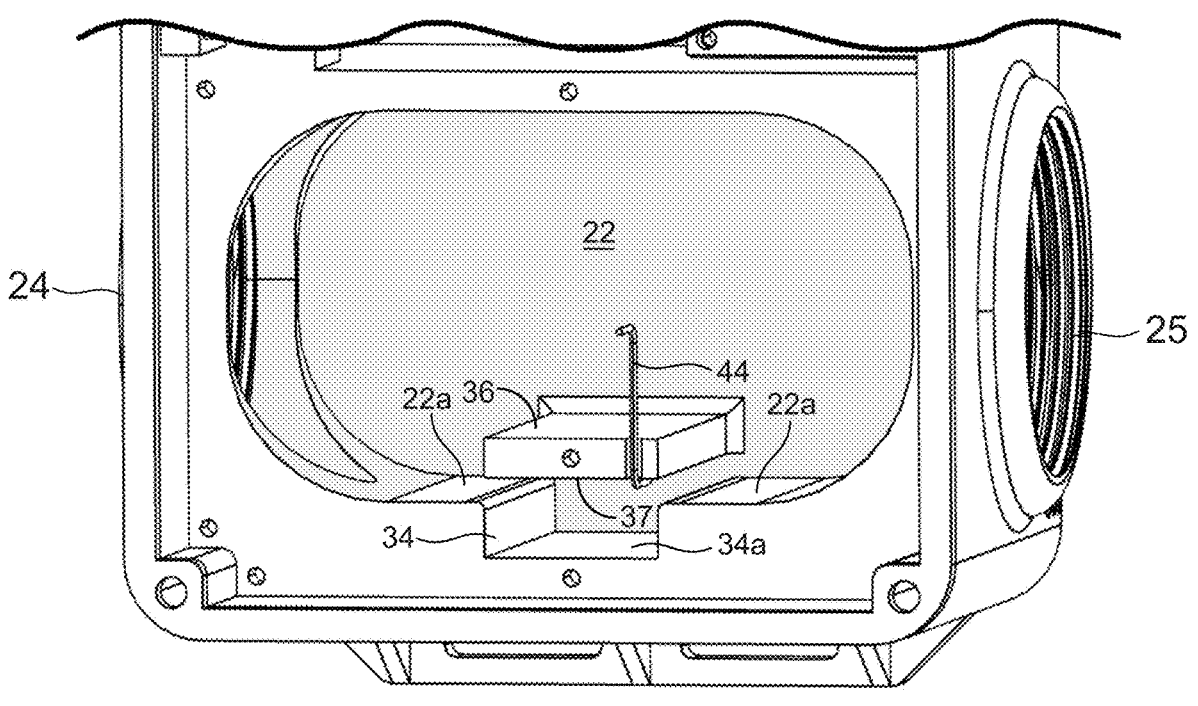
FIG. 3 is a is a close-up view of the lower water compartment thereof.

With reference now to FIGS. 2C-D and 3, the bottom 22a of the fluid passageway of the water compartment 22 includes a lateral notch 34 formed therein and an elevated lateral ledge 36 positioned above, forming a void or chamber for capturing a plurality of micro-spheres 42 forming a vortex creation module 40. The opening between the bottom surface 37 of the lateral ledge 36 and the bottom 22a of the fluid passageway of the water compartment 22 creates a secondary passageway that permits only a portion of the fluid flowing through the entire fluid passageway to flow through the vortex creation module 40.

The vortex creation module 40 of the present invention is similar, yet simplified, in form and function to the tubular vortex chamber members previously disclosed in Applicant's U.S. Pat. Nos. 7,238,289 and 7,473,372, the disclosures of which are incorporated by reference. For example, the vortex creation module 40 of the present invention does not require any strainer device to hold the plurality of micro-spheres 42 in place as used in prior embodiments. Moreover, the vortex creation module 40 of the present invention does not require the use of metallic strands as in previously disclosed embodiments. In addition, the use of tungsten carbide alloy micro-spheres has been found to be superior in performance compared to other materials. The vortices are created by a plurality or series of rows of micro-spheres 42.

The plurality of micro-spheres 42, which comprise the vortex creation module 40, are held within the void or chamber formed between the underside 37 of lateral ledge 36 and the lateral notch 34 formed in the bottom of the fluid passageway of the water compartment 22. The spacing between the bottom surface 37 of the lateral ledge 36 and the bottom 22a of the fluid passageway of the water compartment 22 is less than the diameter of the micro-spheres 42 so that when the water-tight compartment cover 26 is properly configured and attached to lower section 22, the plurality of micro-spheres 42 comprising the vortex creation module 40 are captured and held securely in place between the bottom 34a of the lateral notch 34 and the bottom surface or underside 37 of the lateral ledge 36.

The vortex creation module 40 of the present invention is designed to create vortices in the fluid (not shown). As the water (not shown) flows in between the spaces of the micro-spheres 42 it is subjected to intense turbulence and many vortices. The micro-spheres 42 are metal and preferably made of a tungsten carbide alloy.

The micro-spheres 42 may be arranged into a plurality of ordered parallel rows, although it is not required. The micro-spheres 42 may be configured in stacked or offset rows. Such formations are dependent upon the dimensions of the interior of lateral notch 34, and the diameters of the micro-spheres 42. The number of micro-spheres 42 in each row and their positioning can be modified to fit the vortex creation module 40.

The vortices generated by the vortex creation module 40 act to erase the EMF memory from the water (not shown) and prepare it to accept the frequencies generated by a frequency generator configured in signal board PCB 30. A frequency antenna 44 constructed of a tungsten alloy wire is electrically connected to the vortex creation module 40 and configured to connect to the signal board PCB 30. The frequency antenna 44 is energized by a frequency generator and used to impart a frequency upon the fluid. The frequency generator supplies power to the frequency antenna 44. For example, in one embodiment the frequency antenna 44 projects into the vortex creation module 40 and imparts positive frequencies upon the fluid (not shown) prior to it leaving the vortex creation module 40 to create a permanent change to the EMF memory of the fluid. The frequency antenna 44 may comprise a single lead connected to the frequency generator with no ground lead provided. In this case, the electrical circuit between the frequency antenna 44 and the frequency generator is not complete. The power that is passed to the frequency antenna 44 is DC current with variable frequencies of up to 1000 Hertz. Thus, frequency is released into the water (not shown) near the exit of the vortex creation module 40. The frequency antenna 44 is in contact with the micro-spheres 42 forcing the DC current into the water via micro-spheres 42 electrons generating ions. If the fluid (not shown) is water (not shown), the modified water (not shown) is known as clustered water (not shown). The multiple vortices created by the micro-spheres 42 cause a centripetal, inward-directed, movement of the water (not shown). This natural centripetal movement infuses the energy patterns into the water (not shown), causing a long-lasting change.

In order to ensure creation of the vortices and increase their energy, fluid (not shown) may be passed through the vortex creation module 40 using relatively high pressure, often at least 20 psi. The pressure allows longer contact with the micro-spheres 42 and a uniformity of exposure. However, such pressure is not required in all cases.

Any trace mineral salts in the water (not shown) will be polarized upon passing through the terminal, on its way out of the system. This results in the suspension of all material in the water (not shown) due to polarization and the prevention of any deposits (called scaling) being allowed to form on the inside of the fluid system (not shown) as randomly polarized mineral salts can do.

pH is the balance between charges in the water (not shown). Wide variations in pH damage equipment and can reduce the effectiveness of chemicals. By organizing the water (not shown) using ions generated by the vortex creation module 40 causing suspended solids to precipitate out of the water, the pH will become more stabilized.

The fluid flow travels in a straight path until encountering the micro-spheres 42 at which time it swirls around the micro-spheres (38) with strands of water (not shown) coming together to form micro-vortices (not shown). The micro-spheres 42 rapidly swirl the fluid (not shown) to be treated into many vortices among the electrified micro-spheres 42. The relatively high pressure on the fluid (not shown) moving it through the vortex creation module 40 subjects the fluid (not shown) to the effects of the described frequency generation device. The combination of the small, spherical micro-spheres 42, and high pressure passing the fluid (not shown) through the fluid treatment apparatus 100 at sufficient velocity to create vortices, act in combination to kill unwanted bio-material. An additional benefit can be the precipitation out of minerals such as iron, calcium, and magnesium, thus helping to prevent scaling.

Through experience it has been found that only a portion of the total fluid that flows through the system needs to pass through the vortex creation module to destroy a sufficient amount of biological contaminants such as bacteria, algae, and fungi. Moreover, it has been found that that the system should only operate periodically so that biological contaminants, such as bacteria, algae and fungi are prevented from acclimating to the EMF signature of the treated fluid. Experience has shown that a periodic treatments once or twice a month for 4-12 hours effectively treats a 12,000-gallon pool.

Figure 4:
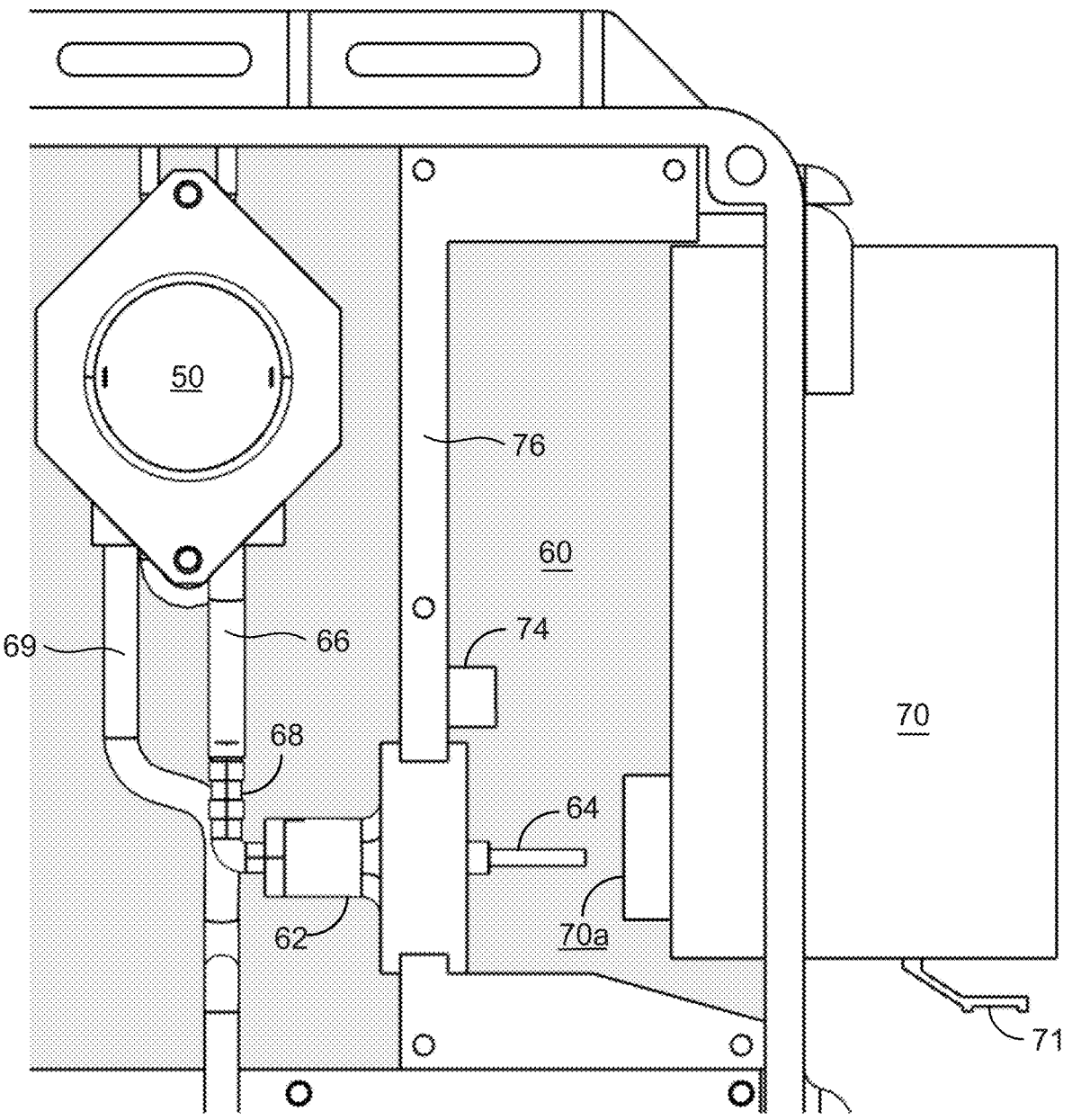
FIG. 4 is a close-up cut-away view of the pump and biological cartridge system of the present invention shown in FIG. 2A.

With reference now to FIGS. 2C and 4, the automatic and integral biologic dispensing system of the present invention is described in greater detail. As previously mentioned, the biologic dispensing system includes dosage pump 50 connected to the interface PCB 80 via an electrical interface cable 52. While the electrical interface connector 52 is depicted as a wire or cable, it is understood that connection 52 could be a wireless computerized connection. In a preferred embodiment, the dosage pump 50 is a positive displacement pump (i.e., no back pressure) controlled by the interface PCB 80. The dispensing system also includes which supply the pump 50 with biologic cleaning fluid from a supply cartridge 70 and distribute an effective amount of the biologic cleaning fluid into a port 27 configured near the vortex creation module 40 within the fluid passageway of the lower section or water compartment 22.

The supply cartridge 70 is housed in a compartment 60 formed within the upper compartment or section 19 but accessed from the side wall 20 of the main housing 10. When activated, the pump 50 draws biologic cleaning fluid contained in the cartridge 70 by a hollow needle 64 connected via cartridge gasket 62, tube adapter 68 and supply tube 66. The pump 50 then dispenses the biologic cleaning fluid through a conduit 69 fluidly connected to a port 27 configured on the water compartment cover 26. The port 27 is configured to direct the biologic cleaning fluid dispensed through conduit 69 directly into the void or chamber holding the vortex creation module 40 contained within the water compartment 22. The interface PCB 80 ensures that the detected flow of the fluid through the lower section or water compartment 22 has stopped prior to allowing the biologic dispensing system to dispense any biologic cleaning fluid into the vortex creation module 40.

The hollow needle 64 is designed to access biologic cleaning fluid contained in the cartridge 70 via an injection site 70a configured on the cartridge 70. The cartridge 70 may also include a clip 71 for latching the cartridge 70 into the compartment 60. The compartment 60 may also include a bumper 74 attached to a partition wall 76 for properly seating the cartridge 70 within the compartment 60.

The signal board PCB 30 and interface PCB 80 continually monitor the fluid flowing through the fluid treatment apparatus 100 of the present invention. A conductivity sensor configured on the signal board PCB 30 continually monitors the conductivity of the system and fluid. For example, in one embodiment the signal board PCB 30 includes a sensor that constantly monitors the impedance of the power supplied to the frequency antenna 44. The interface PCB 80 monitors the back voltage of the conductivity sensor to generate a current or base measurement. As the impedance increases (i.e., conductivity decreases) a microprocessor on the signal board PCB 30 increases the power supplied (i.e., voltage) to the frequency antenna 44 via pulse width modulation of DC variable voltage.

When the micro-spheres 42 attract enough mineral deposits the monitored conductivity of the fluid and system decreases. As the measured current drops the interface PCB 80 increases the duty cycle until it approaches a maximum degradation level or threshold in comparison with the base measurement demonstrating that a sufficient percentage of the conductivity has fallen indicating the vortex creation module 40 is sufficiently fouled and in need of cleaning. It should be understood that such cleaning is typically only necessary on a very infrequent basis (e.g., every 6 months to 1 year), depending upon the physical and chemical characteristics of the water.

When the system determines that the vortex creation module 40 is sufficiently fouled a cleaning cycle is scheduled by the interface PCB 80. When a flow sensor on the signal board PCB 30 next detects that the circulating flow through the fluid treatment apparatus 100 has ceased, the interface PCB 80 initiates a cleaning cycle. The cleaning cycle includes de-energizing the frequency antenna 44 that is electrically connected to the vortex creation module 40. The dosage pump 50 is next activated to draw an effective amount of biologic cleaning fluid from the supply cartridge 70 and pump it via conduit 69 through port 27 and directly into the chamber holding the vortex creation module 40 contained within the water compartment 22.

In a preferred embodiment, the dosage pump 50 is a positive displacement pump (i.e., no back pressure) controlled by the interface PCB 80. The dispensing system also includes fluid conduits which supply the pump 50 with biologic cleaning fluid from a supply cartridge 70 and distribute an effective amount of the biologic cleaning fluid into a port 27 configured near the vortex creation module 40 within the fluid passageway of the lower section or water compartment 22. In one embodiment, the biologic cleaning fluid comprises biological microbial enzymes or microbes. For example, a biologic cleaning fluid comprising genus *bacillus* has been found to be quite effective. The pump 50 then dispenses the biologic cleaning fluid through a conduit 69 fluidly connected to a port 27 configured on the water compartment cover 26. The port 27 is configured to direct the biologic cleaning fluid dispensed through conduit 69 directly into the vortex creation module 40 contained within the water compartment 22. As the dosage pump 50 is a positive displacement pump, the dosage amount is predicated upon the run time (i.e., dispensing time) of dosage pump 50. The dosage amount will vary depending upon the size of the vortex creation module 40, however, in embodiment depicted in the Figures the dosage amount ranges from 0.5 ml to 1.5 ml. The biologic cleaning fluid includes microbial biological enzymes or microbes that effectively clean the micro-spheres 42 comprising the vortex creation module 40. After an allotted cleaning period (e.g., typically 4-6 hours), the interface PCB 80 re-energizes the frequency antenna 44 that is electrically connected to the vortex creation module 40 effectively killing all the microbial biological enzymes or microbes in the biologic cleaning fluid. The recirculation system is then activated resuming the circulative flow of fluid through the fluid passageway of water compartment 22 and washing the microbes from the vortex creation module 40 to a downstream filter (not shown).

Although there are many disclosed and possible embodiments of the present invention, they work on the same principle and engage the same method. Each embodiment incorporates a fluid system (not shown), or fluid source (not shown), with a vortex creation apparatus and a frequency generation device. A portion of the fluid in the fluid passageway, generally water, is passed through a vortex creation module 40 creating a plurality of vortices. Generally, this is done using a secondary passageway formed within the main passageway that permits only a portion of the fluid flowing through the entire fluid passageway to flow through the vortex creation module 40. The secondary passageway comprises a chamber designed to house a vortex creation module to create vortices in the fluid. This is intended to erase the "memory" from biological contaminants from the fluid. It also readies the fluid to "memorize" a new, desirable frequency, which is applied though a number of means such as electricity, audio, and magnetic. The desirable frequencies make the fluid an inhospitable environment for the biological contaminants, such as bacteria, algae, and fungi, reducing their numbers in the fluid.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An apparatus for treating a fluid comprising:
a housing divided into two compartments, wherein a lower compartment comprises a fluid passageway having an inlet and an outlet connected to a fluid system and an upper compartment comprises an integral cleaning system;
wherein said fluid passageway includes a vortex creation module comprising a plurality of micro-spheres captured within a notch formed in said fluid passageway and in communication with a portion of the fluid flowing through said fluid system and a frequency antenna attached inside said vortex creation module in contact with said fluid such that a frequency is applied to said portion of said fluid flowing through said vortex creation module,
wherein said integral cleaning system includes a system for detecting a degradation of effectiveness of the micro-spheres within the vortex creation module; and a system for periodically dispensing an effective amount of a biologic cleaning fluid from a storage cartridge to said vortex creation module when the flow rate of the fluid through said passageway is stopped.

2. The apparatus of claim 1, wherein said integral cleaning system includes a dosage pump for supplying said biologic cleaning fluid through fluid conduits from a supply cartridge to a fluid port configured near said vortex creation module.

3. The apparatus of claim 1, wherein said biologic cleaning fluid comprises biological microbial enzymes.

4. The apparatus of claim 1, wherein said biologic cleaning fluid comprises genus *bacillus*.

5. The apparatus of claim 1, wherein said integral cleaning system detects degradations in the effectiveness of the micro-sphere by monitoring decreases in the conductivity of the fluid through the system.

6. The apparatus of claim 5, wherein the integral cleaning system compares the current conductivity of the fluid to a historic base conductivity of the fluid.

7. The apparatus of claim 1, wherein said lower compartment further includes a waterproof cover sealing off said fluid passageway from said upper compartment, said cover including sensors for detecting and measuring characteristics of the fluid and a fluid port configured near said notch formed in the fluid passageway.

8. An apparatus for treating a fluid comprising:
a housing divided into two compartments, wherein a lower compartment comprises a fluid passageway having an inlet and an outlet connected to a fluid system and a vortex creation module comprising a plurality of micro-spheres made of tungsten carbide alloy and captured within a notch formed in said fluid passageway and in communication with a portion of the fluid flowing through said fluid system;
a frequency antenna attached inside said vortex creation module in contact with said fluid such that a frequency is applied to said portion of said fluid flowing through said vortex creation module.

9. The apparatus of claim 8, further comprising a frequency lead connecting said frequency antenna to a frequency generator, said frequency generator supplying electricity to said frequency antenna at up to 1000 Hz.

10. The apparatus of claim 8, wherein said micro-spheres are arranged in a plurality of parallel rows.

11. The apparatus of claim 8, wherein said frequency antenna is made of tungsten alloy.

12. The apparatus of claim 8, wherein said vortex creation module is captured within said notch formed in said fluid passageway by a ledge configured above said notch.

13. The apparatus of claim 12, wherein the distance between the underside of said ledge and the surface of said passageway is less than the diameter of said micro-spheres.

14. The apparatus of claim 8, wherein said lower compartment further includes a waterproof cover sealing off said fluid passageway from an upper compartment, said cover including sensors for detecting and measuring characteristics of the fluid and a fluid port configured near said notch formed in the fluid passageway.

15. The apparatus of claim 14, wherein said characteristics of the fluid include temperature, conductivity and flow rate.

16. The apparatus of claim 15, further comprising an integral cleaning system comprising:

a system for detecting a degradation of effectiveness of the micro-spheres within the vortex creation module;

a system for periodically dispensing an effective amount of a biologic cleaning fluid from a storage cartridge to said vortex creation module when the flow rate of fluid through said passageway is stopped.

17. The apparatus of claim 16, wherein said biologic cleaning fluid comprises biological microbial enzymes.

18. The apparatus of claim 17, wherein said biologic cleaning fluid comprises genus *bacillus*.

19. A method for reducing biological contaminants in water comprising:

providing a vortex creation module confined within a notch formed in a fluid passageway, said passageway having an inlet and an outlet, said passageway first end attached to a water supply line, said passageway second end attached to a water return line, a plurality of micro-spheres made of tungsten carbide alloy and contained inside said vortex creation module, and held in place by ledge configured above said notch; and a frequency generation device in operative engagement with said vortex creation module such that frequency waves emitted from said frequency generation device contact said fluid;

allowing a portion of said water to form a plurality of vortices; and applying a frequency wave to said water.

20. The method of claim 19 wherein the waves are at a frequency in the range up to 1000 Hz.

\* \* \* \* \*